UNITED STATES PATENT OFFICE.

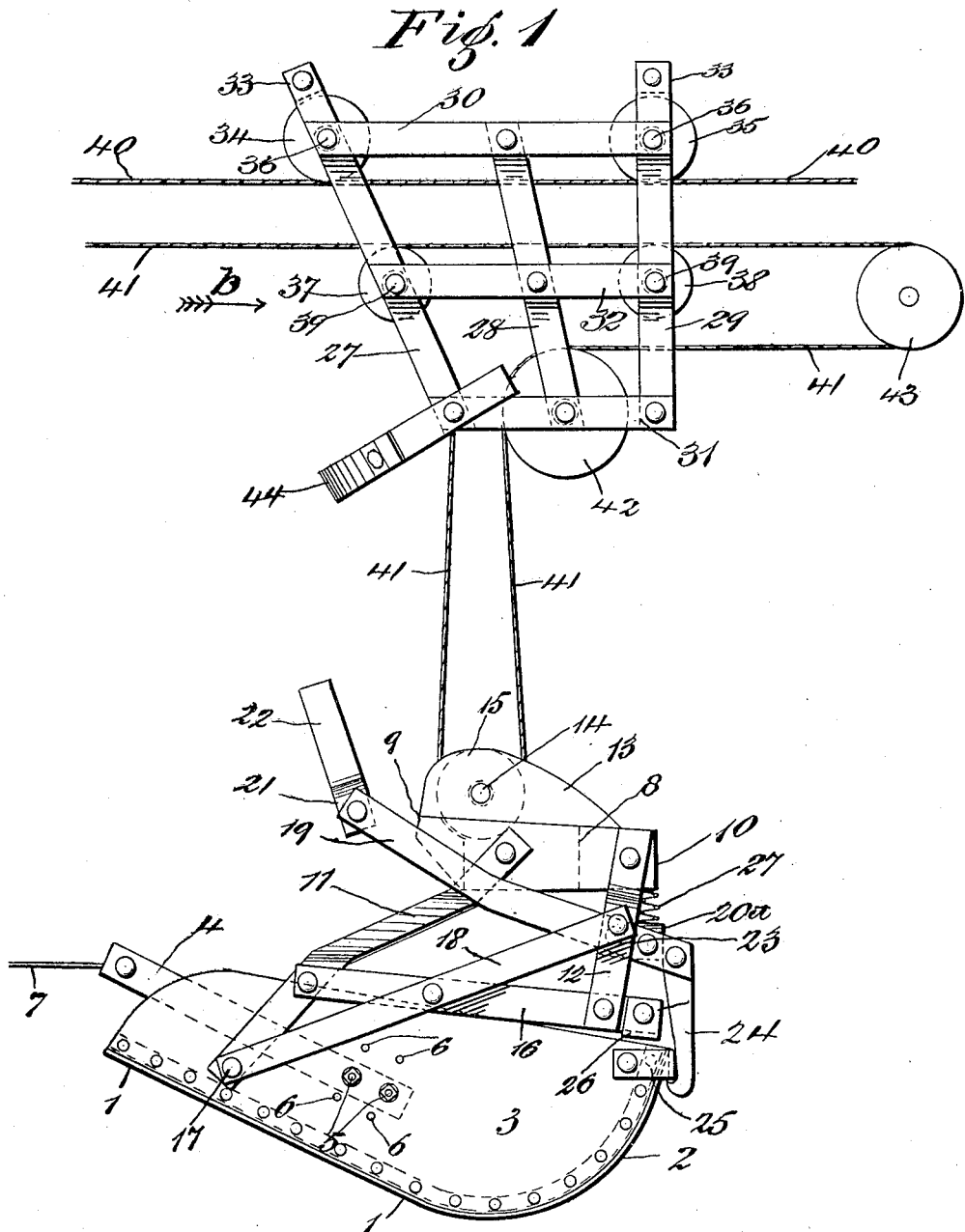

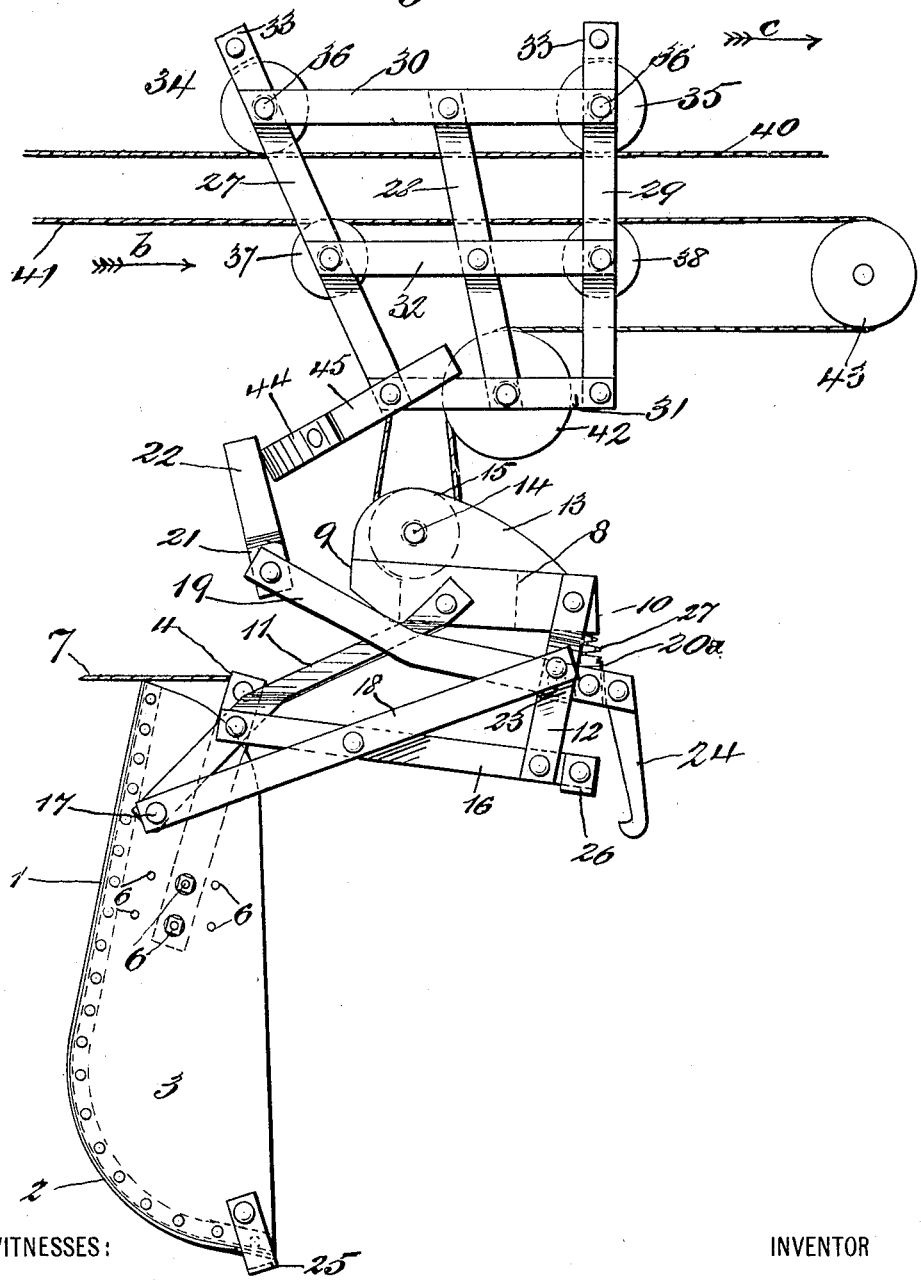

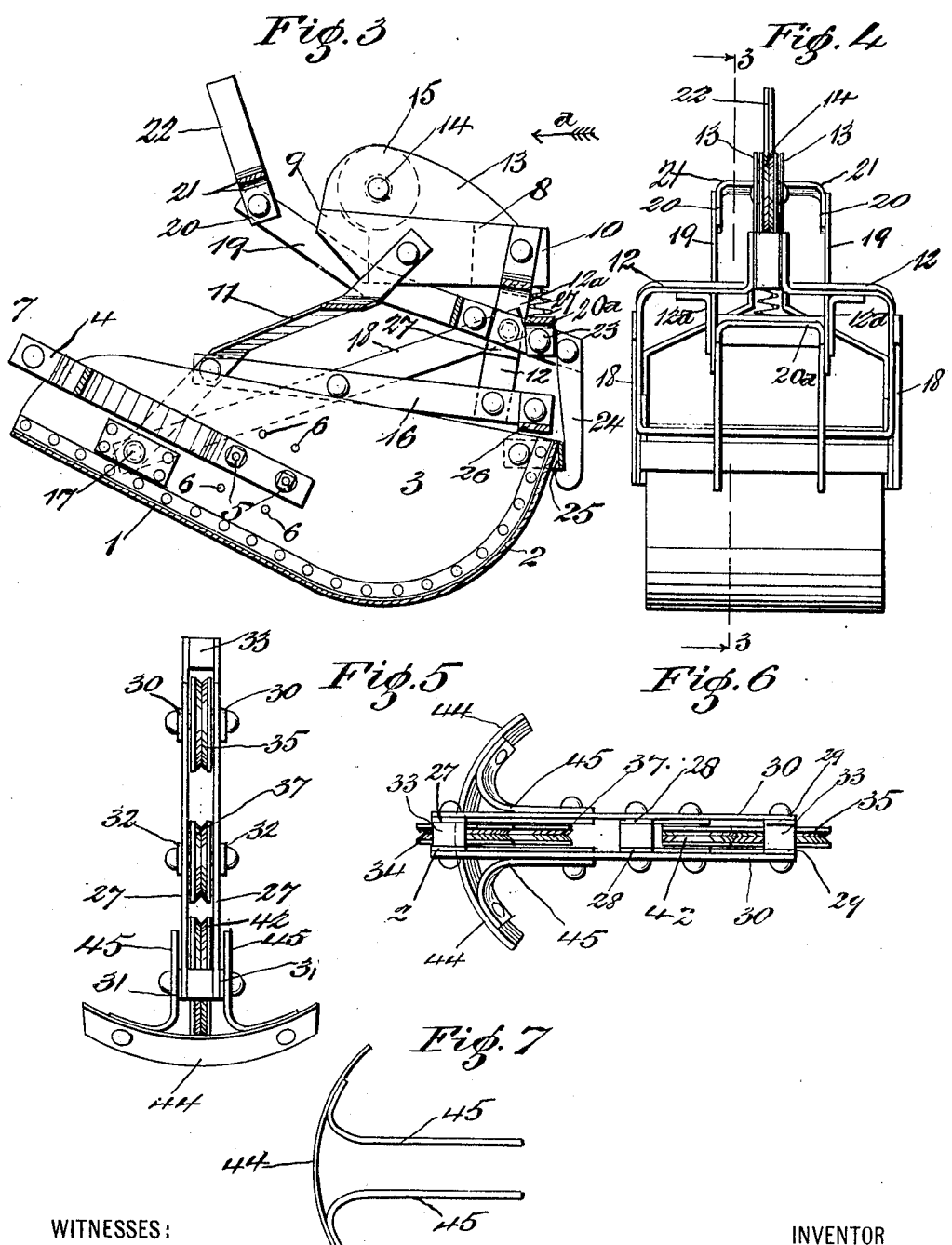

DAYTON H. GILSON, OF RUSHVILLE, INDIANA.

EXCAVATING APPARATUS.

No. 910,055.    Specification of Letters Patent.    Patented Jan. 19, 1909.

Application filed June 29, 1908. Serial No. 440,987.

*To all whom it may concern:*

Be it known that I, DAYTON H. GILSON, a citizen of the United States, residing at Rushville, in the county of Rush and State of Indiana, have invented certain new and useful Improvements in Excavating Apparatus, of which the following is a specification, reference being had therein to the accompanying drawing.

This invention relates to an improvement in a scoop excavating apparatus hereinafter described in the specification and particularly pointed out in the claims.

The object of this invention is to provide a mechanism whereby excavations may be readily made and the scoop lowered into and elevated out of an excavation, and transmitted therefrom to any suitable place or vehicle whereby the contents of the scoop may be dumped or deposited; also to provide an automatic means whereby said scoop may be automatically operated to dump its load; also means whereby the scoop may be swung or moved to be latched automatically to secure said scoop in its normal closed position after having dumped its load.

I attain these objects by means of the scoop and the scoop operating mechanism illustrated in the accompanying drawings in which like numerals of reference designate like parts throughout the several views.

Figure 1 is a side view of the scoop and the conveying carriage thereof; Fig. 2 is a similar view showing the scoop in dumping position; Fig. 3 is a side longitudinal sectional view of the scoop; Fig. 4 is an end view looking in the direction of the arrow *a*; (see Fig. 3); Fig. 5 is an end view of the conveying carriage looking in the direction of the arrow *b* in Figs. 1 and 2; Fig. 6 is a top view of the same; and, Fig. 7 is a detail top view of the trip.

The scoop may be of the usual or any form of scoop used in excavating, and consists of the bottom 1, terminating in the rear curved back portion 2, and the side portions 3. The scoop bail 4 is adjustably secured to the inner sides of the side portions of the scoop by the bolts 5. Additional bolt holes 6 are provided in said sides and said bolts are so situated relatively to the bottom 1 of the scoop, that the position of the said bail may be varied relatively to the bottom flat portion of the scoope when such is desired.

The forward end of the bail 4 is connected to one end of the hauling rope 7 which rope extends to a drum of a suitable hauling engine, whereby said scoop is pulled or hauled horizontally to excavate.

The carrying bail frame of the scoop is composed of the two upper parallel bars 8 which are separated and maintained at the required distance apart by the forward and rear separating pieces 9 and 10 which bars and separating pieces are securely riveted or bolted together, and said bars are riveted or otherwise secured to the top end portion of the Z-formed forward and rear bars 11 and 12. To the inner sides of each of the bars 8 are secured the two parallel plates 13 which are bored to receive the ends of the pin 14, upon which the pulley 15 is mounted to revolve, and in the said bores the ends of said pin are secured. To the top end portions of the legs of the Z-bars 11 and the bottom end portions of the legs of the Z-bars 12, are secured the lower longitudinally extending bars 16 which extend from the top ends of the lower outer legs of the Z-portions of the forward bars 11 to the lower outer ends of the Z-portions of the rear bars 12, and said lower bars are riveted or otherwise securely fastened or connected together. The forward lower ends of the bars 11 are prolonged to extend downwardly over the outer sides of the excavating scoop, and through the ends of said bars are bored pivotal holes through which the pivotal studs 17, secured to the sides of the scoop, pass and are fitted and whereby the forward end portion of said scoop is pivotally supported The diagonal tie-bars 18 are bored at their forward ends to fit the pivotal studs 17, and said bars extend from said pivotal studs 17 over the center portions of the bars 16 to the top portions of the rear bottom portions of the rear Z-bars 12 and the said bars 18 are securely riveted or otherwise connected to the bars 16 and the bars 12, so as to rigidly secure the several members of the frame work in position. The latch bars are composed of two side bars 19, both of which are alike, and said bars are rigidly connected at their forward ends to the bearing feet 20 of the cross bar 21 of the trigger 22, by suitable bolts or rivets to form a latch frame and the frame thus formed is pivotally connected to the lower angle pieces 12$^a$ secured to the bars 12 by the pivotal pins 23 which pivotally connect the latch bars 19 of the latch frame to the Z-bars 12 of the supporting frame.

The latches 24 are secured at their top ends to the rear projecting ends of the bars 19 to depend therefrom and said latches are adapted to engage the catch bars 25 secured to the rear upper portions of the sides 3 of the scoop. At the rear projecting ends of the bars 16 is situated the cross stop-bar 26 which bar is bent at its ends to form feet bearings which are bolted, riveted or otherwise permanently secured to said projecting ends, and the said cross stop-bar 26 is provided for the purpose of forming a stop against which the top side portions of the scoop are adapted to contact when the scoop is being moved or hauled in excavating, to prevent said scoop from turning or tilting too far on its pivotal pins when in operation to dig too deeply into the ground. Between the cross bar 20ª and the distance piece 10 is situated a coil spring 27 by which that end of the latch frame to which the latches 24 are secured is yieldingly maintained in its lower position to cause said latches to engage said catch bar 25.

The traversing carriage by which the scoop and its supporting frame is transported from place to place, is composed of two side frames each of which is composed of the forward bar 27, the intermediate bar 28, and the rear bar 29, which bars are connected and secured at or near their top ends to the horizontal bar 30 and at their bottom ends to the horizontal bars 31 and said bars 27, 28 and 29 are connected and secured at points intermediate their ends to the intermediate horizontal bars 32. Between the top prolonged end portions of the bars 27 and 29 are provided distance blocks 33 which are secured in position therebetween by suitable rivets, and between the top end portions of the bars 27 and 29 are the sheaves 34 and 35 which are journaled on the journal pins 36, which latter are secured at or near their ends to the top ends of said bars 27 and 29. The rope guiding sheaves 37 and 38 are also situated between said side frames and journaled on the journal pins 39 secured to the bars 27 and 29.

The sheaves 34 and 35 are mounted on the cable 40, which cable may be extended over and above that portion of the ground to be excavated, so that the traversing carriage may be traversed thereupon to any position on said cable there to operate said scoop. The cable 40 may be secured at its ends to suitable posts or stakes situated at a suitable distance apart and secured in the ground. That end of the cable, secured to that post or stake situated further remote from the winding engine, is preferably situated higher upon that post than that end of the cable secured to that post situated nearer to the said winding engine, so that said fixed cable 40 will be inclined to the horizon, or on an incline from the further post to the nearer post, for the purpose of causing the traversing carriage of the excavating apparatus, when loaded, to tend to traverse along said cable toward the winding engine.

The hoisting cable 41 is secured at one of its ends to the bottom members 31 of the traversing carriage frame and is passed under the pulley 15 over the pulley 42 to and around the fixed sheave pulley 42 and back over the rope guiding sheaves 37 and 38 and thence to a winding drum of a suitable hoisting engine. The contacting surface of the trigger 44 is circular in form and is securely riveted to the arms 45 which latter are securely riveted to the bottom bars 31 of the carriage frame in such position that when the trigger 22 of the latch bars 18 come in contact with said trip 44 the latch 24 will release the catch 25 to permit the scoop to swing downwardly, as shown in Fig. 2, to dump the contents thereof.

The operation of this device is as follows:—Suppose it is required to move the traversing carriage and the scoop connected thereto some distance along the cable 40 in the direction of the arrow c, that is further from the position of the winding or hauling drums of the engine and the operator, to a desired position in the excavation. To accomplish this expediately the operator gradually lets out the hauling cable 7 and pulls or winds up the cable 41 to draw the traversing carriage forward or in the direction of the arrow c, and when it is required to move the traversing carriage in the opposite direction the reverse operation takes place, namely the cable 41 is gradually let out and the cable 7 drawn in. When it is necessary to hoist or elevate the scoop from an excavation the cable 7 is held stationary and the cable 41 is wound upon its drum; and to lower the scoop, the excavating cable 7 is wound in very gradually and the cable 41 let out. When the scoop has released its load the operator takes in the cable 41 by winding it on the drum of the engine to which it is connected to elevate the scoop out of the excavation made, and when it is necessary to move the scoop and its contents along the cable 40 in the direction of the arrow c to a convenient dumping place, the operator winds up the cable 41 and gradually unwinds the cable 7 to traverse said traversing carriage along the cable 40 to bring the scoop in the desired position which having been reached the operator then holds the cable 7 in fixed position and winds the hoisting cable 41 to cause the trigger 22 to contact the trip 44 to disengage the latches 24, as shown in Fig. 2, from the catch 25 to release the end of the scoop and dump the contents thereof at the desired location.

After having thus dumped the contents of the scoop the operator causes his hauling drum upon which the hauling cable 7 is wound, to partially draw in the cable 7 to swing the scoop on its pivotal pins 17 to swing the rear end of said scoop upwardly and in contact with the stop-bar 26 so that the latches 24 will engage the catch 25 after which the scoop is again ready to be lowered into the excavation.

I claim:

1. In an excavating apparatus, the combination with a supporting frame, and a scoop pivotally connected at its forward open end portion to said frame, of a depending latch pivotally connected to said frame, and a catch situated at the rear end of said scoop to be engaged by said latch to support the end of said scoop, a bail adjustably secured to said scoop and adapted to project, at its forward end, beyond the open end portion of said scoop, a hauling rope connected to the forward end of said bail, whereby, when the scoop is unlatched to depend from its pivotal center, said hauling rope is operated to swing said scoop into position, to be engaged by said latching means.

2. In an excavating apparatus, the combination with a supporting frame and a scoop pivotally connected at its front end portion to said frame, a latch bar pivotally connected to said frame, a latch at one end of said latch bar, and a trigger at the other end of said bar, a latch catch situated at the rear end of said scoop, of a traversing carriage, a hoisting cable extending from said traversing carriage to said supporting frame of said scoop, and a trip secured to said traversing carriage in position to contact said trigger.

3. In an excavating apparatus, the combination with a supporting frame and a scoop pivotally connected at its front end portion to said frame, a latch bar pivotally connected to said frame, a latch at one end of said latch bar, and a trigger at the other end of said bar, a latch catch situated at the rear end of said scoop of a traversing carriage, a hoisting cable extending from said traversing carriage to said supporting frame of said scoop, and a curved trip extending beyond the ends of the carriage frame, secured to said traversing carriage in position to contact said trigger substantially as, and for the purpose set forth.

4. In an excavating apparatus, the combination with a supporting frame and a scoop pivotally connected at its front end portion to said frame, a latch bar pivotally connected to said frame, a latch at one end of said latch bar and a trigger at the other end of said bar, a latch catch situated at the rear end of said scoop, and a hauling bail situated at the front end of said scoop, of a traversing carriage, a hoisting cable extending from said traversing carriage to said supporting frame of said scoop and a trip secured to said traversing carriage.

In testimony whereof I affix my signature in presence of two witnesses.

DAYTON H. GILSON.

Witnesses:
THOMPSON R. BELL,
JESSIE THOMPSON.